(12) United States Patent
Suzuki et al.

(10) Patent No.: US 7,533,999 B2
(45) Date of Patent: May 19, 2009

(54) AUXILIARY LIGHTING DEVICE OF CAMERA

(75) Inventors: Akihiro Suzuki, Sagamihara (JP); Yoshito Katagiri, Hachioji (JP)

(73) Assignee: Konica Minolta Photo Imaging, Inc., Tokyo (JP)

( * ) Notice: Subject to any disclaimer, the term of this patent is extended or adjusted under 35 U.S.C. 154(b) by 0 days.

(21) Appl. No.: 11/667,894

(22) PCT Filed: Oct. 31, 2005

(86) PCT No.: PCT/JP2005/019995

§ 371 (c)(1), (2), (4) Date: May 15, 2007

(87) PCT Pub. No.: WO2006/005440

PCT Pub. Date: May 26, 2006

(65) Prior Publication Data

US 2007/0291465 A1 Dec. 20, 2007

(30) Foreign Application Priority Data

Nov. 18, 2004 (JP) ............................. 2004-334402

(51) Int. Cl.
*G03B 15/02* (2006.01)
*G03B 15/03* (2006.01)
*G03B 15/06* (2006.01)

(52) U.S. Cl. ................. 362/16; 362/3; 362/18; 396/155; 396/175

(58) Field of Classification Search ............... 362/3, 362/16, 18; 396/155, 175
See application file for complete search history.

(56) References Cited

U.S. PATENT DOCUMENTS

| 5,813,743 A * | 9/1998 | Naka ........................... 362/16 |
| 6,685,342 B2 * | 2/2004 | Terada ......................... 362/327 |

FOREIGN PATENT DOCUMENTS

| JP | 3-194529 A | 8/1991 |
| JP | 9-80593 A | 3/1997 |
| JP | 2000-75383 A | 3/2000 |

* cited by examiner

*Primary Examiner*—Sandra L O'Shea
*Assistant Examiner*—William J Carter
(74) *Attorney, Agent, or Firm*—Cohen Pontani Lieberman & Pavane LLP

(57) ABSTRACT

Presented is an auxiliary lighting device that is incorporated in a camera and is disposed at a position apart from an optical axis of a photographic lens for capturing a subject. The device includes a light emitting member with a cylindrical shape to emit light for irradiating a subject, a circumferential wall reflector disposed behind the light emitting member to reflect the light emitted from the light emitting member toward the subject, a first sidewall reflector with a surface that intersects a longitudinal axis of the light emitting member, and which is disposed at a first position near to the optical axis of the photographic lens, and a second sidewall reflector with a surface that intersects the longitudinal axis of the light emitting member, and which is disposed at a second position far from the optical axis of the photographic lens.

6 Claims, 3 Drawing Sheets

AUXILIARY LIGHTING DEVICE OF CAMERA

RELATED APPLICATIONS

This is a U.S. National Phase Application under 35 USC 371 of International Application PCT/JP2005/019995, filed on Oct. 31, 2005.

FIELD OF THE INVENTION

The present invention relates to an auxiliary lighting device of a camera, and specifically relates to an auxiliary lighting device, which can be preferably incorporated in such a camera that is capable of capturing a close-up image.

TECHNICAL BACKGROUND

Conventionally, a camera has generally incorporated an auxiliary lighting device, so that a good captured image can be obtained by employing the auxiliary lighting device for the image capturing operation, even when the image is captured in a dark environment or under a backlight condition.

A light irradiating section of the auxiliary lighting device incorporated in the camera is constituted by a light emitting member formed in substantially a cylindrical shape, such as a Xenon tube, etc., and a reflector on which light emitted from the light emitting member are reflected toward the subject. Further, the reflector is constituted by a circumferential wall section formed around the cylinder axis of the light emitting member and two sidewall sections, which intersect the cylinder axis of the light emitting member and oppose to each other. In the conventional auxiliary lighting device for general purpose, cross sectional shapes of the reflector, being orthogonal to the axis direction of the Xenon tube, have been the same at any positions on the axis direction of the Xenon tube, and the angle of one of the two sidewall sections versus the surface orthogonal to the Xenon tube has been the same as that of another one of the two sidewall sections.

Departing from such the light irradiating section in the conventional auxiliary lighting device for general purpose as mentioned in the above, for instance, Patent Document 1 sets forth an auxiliary lighting device, in which the shape of the reflector is formed in such a manner that at least a cross sectional shape of the reflector at a specific position, being orthogonal to the axis direction of the Xenon tube, is different from those at any positions other than the specific position, or the cross sectional shape of the reflector continuously changes along the axis direction of the Xenon tube, or the cross sectional shape of the reflector is established as a series of discontinuous shapes in the axis direction of the Xenon tube.

[Patent Document 1]
Tokkaihei 11-102004, (Japanese Non-Examined Patent Publication)

When incorporating the light irradiating section of the auxiliary lighting device in conventional cameras, although the auxiliary lighting device is disposed just above the optical axis of the photographic lens in a state of the horizontal position photography in some conventional cameras, the auxiliary lighting device is generally disposed at such a position that is apart from the optical axis of the photographic lens by shifting it toward an inclined upper-left direction or toward an inclined upper-right direction from the optical axis in most of the conventional cameras.

On the other hand, the photographic lens, to be incorporated in an electric camera in which analogue signals, acquired by photo-electronically converting the captured image of the subject, is further converted into digital image data, and then, predetermined image-processing operations are applied to the digital image data, so as to store the processed digital image data into the recording medium, is generally capable of conducting a close-up photography to such an extent that some electric camera can capture an image of the subject close to the front surface of the lens at a position separating from the subject only by several centimeters.

However, when the camera approaches the subject such the extent as mentioned in the above, there has been a problem that, due to the positional deviation between the light irradiating section of the aforementioned auxiliary lighting device and the optical axis of the photographic lens, an amount of light irradiated onto one side potion of the subject, to which the auxiliary lighting device does not oppose directly, becomes short, resulting in unevenness of exposure amount on the captured image.

Further, in recent years, well known is the bended optical system in which the optical axis is bended in a direction substantially parallel to the front surface of the camera by disposing reflecting member within the photographic lens. In the camera equipped with the abovementioned photographic lens, since the front surface of the lens is substantially equivalent to the front surface of the camera, the aforementioned problem of the unevenness of exposure amount when conducting the close-up photography is getting into more serious situation.

The light irradiating section of the auxiliary lighting device described in the aforementioned Patent Document 1 relates to the shape of the reflector when employing such a camera design concept that the aperture section of the reflector, normally shaped in a rectangular, is not protruded outside from the camera. Accordingly, the irradiating section described in the aforementioned Patent Document 1 cannot be a countermeasure for solving the problem of the unevenness of exposure amount.

SUMMARY OF THE INVENTION

To overcome the abovementioned drawbacks in conventional auxiliary lighting devices, it is one of objects of the present invention to provide an auxiliary lighting device, which makes it possible to reduce the unevenness of exposure amount on the image captured in the close-up photographing mode, even if the auxiliary lighting device is disposed at such a position that is apart from the optical axis of the photographic lens by shifting it toward an inclined upper-left direction or toward an inclined upper-right direction from the optical axis.

Means for Solving the Subject

Accordingly, at least one of the objects of the present invention can be attained by the auxiliary lighting devices described as follows.

(1) According to an auxiliary lighting device reflecting an aspect of the present invention, the auxiliary lighting device that is incorporated in a camera and is disposed at a position being apart from an optical axis of a photographic lens for capturing a subject, comprises: a light emitting member, shaped in substantially a cylinder, to emit light for irradiating a subject; a circumferential wall reflector disposed behind the light emitting member so as to reflect the light, emitted from the light emitting member, toward the subject; a first sidewall reflector, a surface of which intersects a longitudinal axis of the light emitting member, and which is disposed at a first position near to the optical axis of the photographic lens; and a second sidewall reflector, a surface of which intersects the longitudinal axis of the light emitting member, and which is disposed at a second position far from the optical axis of the photographic lens, compared to the first position; wherein a first angle, formed between the first sidewall reflector and an imaginary surface being orthogonal to the longitudinal axis of the light emitting member, is different from a second angle, formed between the second sidewall reflector and another imaginary surface being orthogonal to the longitudinal axis of the light emitting member.

(2) According to another aspect of the present invention, in the auxiliary lighting device recited in item 1, the light emitting member is a Xenon tube.

(3) According to still another aspect of the present invention, in the auxiliary lighting device recited in item 1, the second angle is smaller than the first angle.

(4) According to still another aspect of the present invention, in the auxiliary lighting device recited in any one of items 1-3, the second angle is set at angle α, which fulfills the equation of, $$(\tan^{-1}(a/b) - \tan^{-1}((D-a+c)/(r+b-D\tan\theta)))/2$$

$$\leq \alpha \leq$$

$$(\tan^{-1}(a/b) - \tan^{-1}((D-a+c)/(r+b+D\tan\theta)))/2,$$

where a: a distance between the longitudinal axis of the light emitting member and a leading edge of the second sidewall reflector in a direction of the optical axis of the photographic lens;
b: a distance between a center of the light emitting section and the leading edge of the second sidewall reflector in a direction orthogonal to the optical axis of the photographic lens,
c: a distance between the longitudinal axis of the light emitting member and an intersect of long side light bundles in the direction of the optical axis of the photographic lens,
r: a distance between the optical axis of the photographic lens and the center of the light emitting section in the direction orthogonal to the optical axis of the photographic lens,
D: a distance between a photographic position in a most close-up distance photographing mode and the intersect of the long side light bundles in the direction of the optical axis of the photographic lens, and
θ: a half angle of view in a long side direction.

(5) According to another auxiliary lighting device reflecting an aspect of the present invention, the auxiliary lighting device that is incorporated in a camera and is disposed at a position being apart from an optical axis of a photographic lens for capturing a subject, comprises: a light emitting member, shaped in substantially a cylinder, to emit light for irradiating a subject; a circumferential wall reflector disposed behind the light emitting member so as to reflect the light, emitted from the light emitting member, toward the subject; a first sidewall reflector, a surface of which intersects a longitudinal axis of the light emitting member, and which is disposed at a first position near to the optical axis of the photographic lens; and a second sidewall reflector, a surface of which intersects the longitudinal axis of the light emitting member, and which is disposed at a second position far from the optical axis of the photographic lens, compared to the first position; wherein a second angle, formed between the second sidewall reflector and an imaginary surface being orthogonal to the longitudinal axis of the light emitting member, is changeable.

(6) According to another aspect of the present invention, in the auxiliary lighting device recited in item 5, the light emitting member is a Xenon tube.

(7) According to still another aspect of the present invention, in the auxiliary lighting device recited in item 5, the second angle is changed, corresponding to a subject distance.

EFFECT OF THE INVENTION (8) According to yet another aspect of the present invention, in the auxiliary lighting device recited in any one of items 5-7, the second angle is changed to angle α, which fulfills the equation of, $$(\tan^{-1}(a/b) - \tan^{-1}((D-a+c)/(r+b-D\tan\theta)))/2$$

$$\leq \alpha \leq$$

$$(\tan^{-1}(a/b) - \tan^{-1}((D-a+c)/(r+b+D\tan\theta)))/2,$$

where a: a distance between the longitudinal axis of the light emitting member and a leading edge of the second sidewall reflector in a direction of the optical axis of the photographic lens;
b: a distance between a center of the light emitting section and the leading edge of the second sidewall reflector in a direction orthogonal to the optical axis of the photographic lens,
c: a distance between the longitudinal axis of the light emitting member and an intersect of long side light bundles in the direction of the optical axis of the photographic lens,
r: a distance between the optical axis of the photographic lens and the center of the light emitting section in the direction orthogonal to the optical axis of the photographic lens,
D: a distance between a photographic position in a most close-up distance photographing mode and the intersect of the long side light bundles in the direction of the optical axis of the photographic lens, and
θ: a half angle of view in a long side direction.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

BEST MODE FOR IMPLEMENTING THE INVENTION

The embodiments of the present invention will be detailed in the following. However, the scope of the present invention is not limited to the embodiments described in the following.

Figure 1:
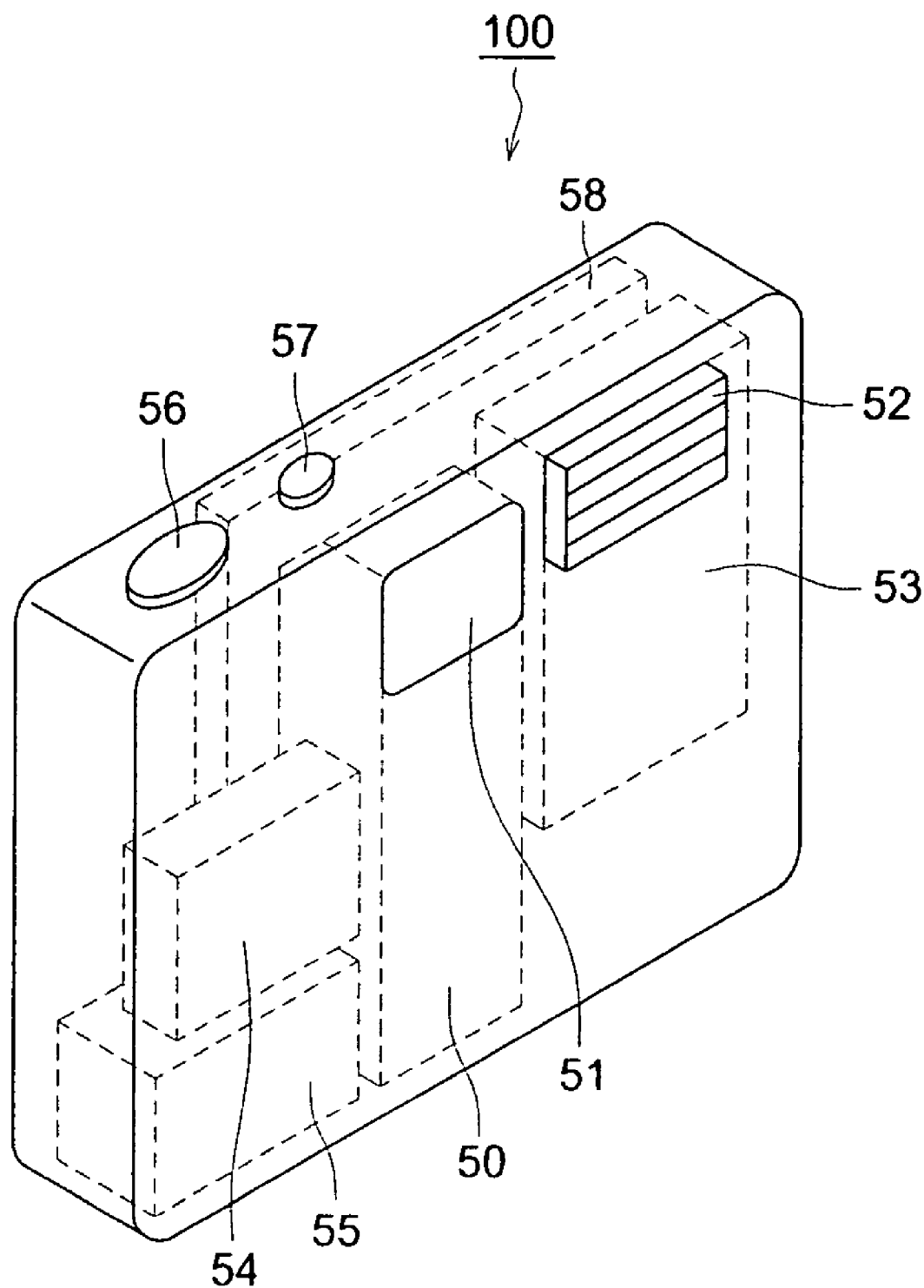
FIG. 1 shows a perspective view of a camera provided with an auxiliary lighting device embodied in the present invention, indicating an example of an internal layout of main units constituting the camera.

FIG. 1 shows a perspective view of a camera 100 provided with an auxiliary lighting device embodied in the present invention, viewing from a subject side and indicating an example of an internal layout of main units constituting the camera 100.

As shown in FIG. 1, in the camera 100, a lens barrel 50, which includes a photographic lens employing a bended optical system capable of varying its magnification factor, is disposed along the front surface of the camera 100, and a aperture section 51 is disposed at such a position that a light bundle emitted from the subject can be captured into the lens barrel 50.

Numeral 52 indicates a cover panel for covering a front surface of a light irradiating section being a part of the auxiliary lighting device, while numeral 53 indicates the auxiliary lighting device constituted by a reflector and a Xenon tube, both of which are disposed at a backside space of the cover panel 52 so as to constitute the light irradiating section, and other electronic parts, printed circuit boards, etc. As shown in FIG. 1, the light irradiating section is disposed at such a position that is deviated in a horizontal direction from the position of the aperture section 51.

Numeral 54 indicates a card-type image recording memory, while numeral 55 indicates a battery for supplying electric power to each of the sections included in the camera 100. The card-type image recording memory 54 and the battery 55 are detachable from a cover section (not shown in the drawings).

A release button 56 is disposed on the upper surface of the camera 100. When pushing the release button 56 down to a first step stroke, photographic preparing operations, namely, a focusing operation and a photometry operation, are implemented, and successively, when further pushing the release button 56 down to a second step stroke, an photographic exposing operation is conducted so as to store digital image data of the photographed image into the card-type image recording memory 54. Numeral 57 indicates a main switch for switching the camera 100 between an operating state and a non-operating state. When the camera 100 is switched into the operating state by operating the main switch 57, the operation of each of the main units, etc. is commenced so as to enable the photographic exposing operation, etc. Further, when the camera 100 is switched into the non-operating state by operating the main switch 57, the operation of each of the main units, etc. is deactivated and finalized.

An image display section 58, which is constituted by display elements, such as a LCD (Liquid Crystal Display), an organic EL (Electric Luminescence), etc., so as to display images and other character information, is mounted into the backside space of the camera 100. Further, operating members, such as a zooming button for activating a zooming up or a zooming down operation, a playback button for reproducing the photographed image on the image display section 58, a menu button for displaying various kinds of menus on the image display section 58, a selecting button for selecting a desired function from various functions displayed in a list, etc., are disposed on the camera 100, though those are not shown in the drawings.

The printed circuit boards, through which the abovementioned main units are coupled to each other and on which various kinds of electronic parts are mounted, are disposed in the spaces between the main units, so as to conducts the driving and controlling operations of each of the main units constituting the camera 100, though those are not shown in the drawings. Further, the camera 100 may be provided with an external input/output terminal, a strap binding section, a tripod seating section, etc., though those are not shown in the drawings as well.

Referring to FIG. 1, which shows the camera Having the internal layout of the main units including the photographic lens and the light irradiating section of the auxiliary lighting device, the auxiliary lighting device will be detailed in the following.

FIRST EMBODIMENT

In the first embodiment, the light irradiating section in which the angles, formed between the two sidewalls constituting the reflector and the surface orthogonal to the light emitting section, are set at values being different from each other.

Figure 2:
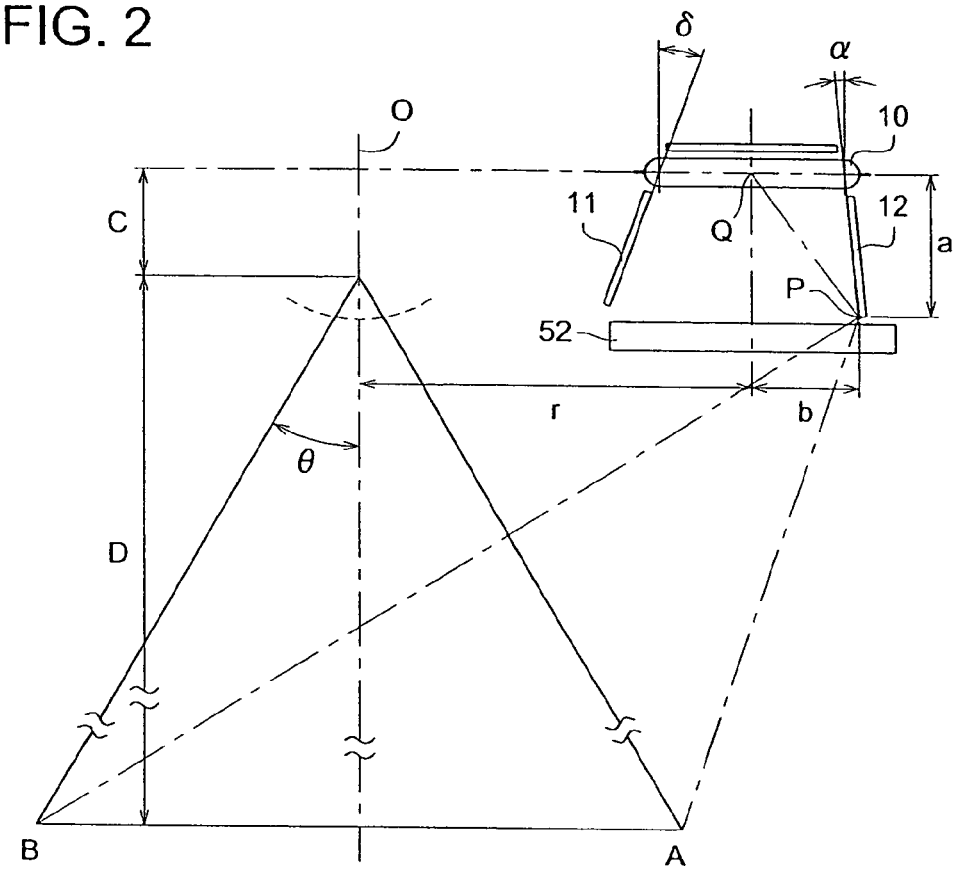
FIG. 2 shows a schematic diagram of a light irradiating section of an auxiliary lighting device embodied in the present invention, indicating a rough arrangement of elements included in the light irradiating section.

FIG. 2 shows a schematic diagram of the light irradiating section of the auxiliary lighting device embodied in the present invention, indicating a rough arrangement of the elements included in the light irradiating section. Further, FIG. 2 is a perspective view of the light irradiating section viewing from the upper side of the camera 100, indicating positional relationships between the photographic light bundle, a light emitting section of the light irradiating section and the two sidewalls, which intersect the light emitting section and oppose to each other.

In FIG. 2, numeral 52 indicates the cover panel, while numeral 10 indicates the light emitting section of the Xenon tube. Symbol O indicates an optical axis of the photographic lens. Numerals 11 and 12 indicate the two sidewalls, which intersect the light emitting section and oppose to each other. As shown in FIG. 2, the sidewall 11 is located at a position near to the optical axis of the photographic lens, while the sidewall 12 is located at another position far from the optical axis of the photographic lens.

As shown in FIG. 2, an angle $\delta$ formed between the sidewall 11 and the surface orthogonal to the light emitting section 10 is different from an angle $\alpha$ formed between the sidewall 12 and the surface orthogonal to the light emitting section 10, without forming a symmetrical arrangement. Specifically, the angle $\delta$ and the angle $\alpha$ are established at such values that fulfill the relationship of $\alpha<\delta$. By setting the angle $\delta$ and the angle $\alpha$ in the manner mentioned in the above, it becomes possible to direct the light, reflected on the sidewall 12 located at the position far from the optical axis O, toward the subject located at a position deviated from the position of the auxiliary lighting device, and accordingly, it becomes possible to make the exposure amount on the photographed image uniform when conducting the close-up image capturing operation, resulting in a reduction of the unevenness of the exposure amount.

Next, a preferable range of the angle $\alpha$, formed between the sidewall 12 and the surface orthogonal to the light emitting section 10, will be detailed in the following.

In FIG. 2, it is preferable that the sidewall 12 is positioned in such a manner that the angle $\alpha$, formed between the sidewall 12 and the surface orthogonal to the light emitting section 10, is equal to or greater than such an angle at which a light, emitted from a center position Q of the light emitting section 10 and reflected by a leading edge P of the sidewall 12, passes through (is irradiated onto) a position A, which is one of both edges of the photographic range of a long side direction in the most close-up distance photographing mode and located near the light irradiating section side, and is equal to or smaller than such an angle at which a light, emitted from the center position Q of the light emitting section 10 and reflected by the leading edge P of the sidewall 12, passes through (is irradiated onto) a position B, which is the other one of the both edges of the photographic range and located far from the light irradiating section side. In other words, it is preferable that the sidewall 12 is positioned in such a manner that the light, emitted from the center position Q of the light emitting section 10 and reflected by the leading edge P of the sidewall 12, is irradiated onto a position located within the photographic range of the long side direction in the most close-up distance photographing mode.

Concretely speaking, in FIG. 2, it is preferable that the sidewall 12 is positioned in such a manner that the angle α, formed between the sidewall 12 located at the position far from the optical axis O and the surface orthogonal to the light emitting section 10, fulfills the following equation.

$$(\tan^{-1}(a/b) - \tan^{-1}((D-a+c)/(r+b-D\tan\theta)))/2$$

$$\leq \alpha \leq$$

$$(\tan^{-1}(a/b) - \tan^{-1}((D-a+c)/(r+b+D\tan\theta)))/2$$

where α: angle formed between the sidewall 12 located at the position far from the optical axis O and the surface orthogonal to the light emitting section 10,
- θ: half angle of view in the long side direction,
- D: distance in the optical axis direction of the photographic lens between the photographic position in the most close-up distance photographing mode and the intersect of light bundles in the long side direction,
- c: distance in the optical axis direction of the photographic lens between the position of the light emitting section 10 and the intersect of light bundles in the long side direction,
- a: distance in the optical axis direction of the photographic lens between the position of the light emitting section 10 and the leading edge of the sidewall 12,
- b: distance in the direction orthogonal to the optical axis O of the photographic lens between the center position Q of the light emitting section 10 and the leading edge P of the sidewall 12,
- r: distance in the direction orthogonal to the optical axis O of the photographic lens between the optical axis O of the photographic lens and the center position Q of the light emitting section 10.

For instance, when D=60 mm, θ=30°, r=40 mm, a=10 mm, b=12 mm and c=10 mm, the range of −2.55°≦α≦17.03° can be found from the above equation. Further, when D=30 mm and other coefficients are the same as those in the above, since the range of −8.20°≦α≦0.53° can be found from the above equation, it is preferable that the sidewall 12 is positioned so that the angle α is established at a value within the above range, corresponding to the layout of the light emitting section in the camera and the specifications of the camera concerned. Incidentally, in the layout shown in FIG. 2, angle in the anticlockwise direction from the surface orthogonal to the light emitting section 10 is defined as a positive angle, while angle in the clockwise direction from the surface orthogonal to the light emitting section 10 is defined as a negative angle.

Further, when the photographic lens is a zoom lens, it is preferable that a half angle of view in the long side direction of the wide image is employed as value θ, and it is applicable that the most close-up photographing distance from the first surface of the photographic lens may be substituted for value D.

As mentioned in the foregoing, by setting the angles, formed between the two sidewalls constituting the reflector and the surface orthogonal to the light emitting section, at values being different from each other, and further, by establishing the angle formed between the sidewall located at the position far from the optical axis of the photographic lens and the surface orthogonal to the light emitting section, so that a light, emitted from the center position of the light emitting section and reflected by the leading edge of the sidewall, is irradiated onto such a position that is located within the photographic range in the long side direction in the most close-up distance photographing mode, it becomes possible to provide an auxiliary lighting device, which makes it possible to reduce the unevenness of the exposure amount when conducting the close-up photographing operation, even if the light irradiating section of the auxiliary lighting device is disposed at a position shifted from the optical axis of the photographic lens.

Further, by disposing the sidewall, located at the position far from the optical axis of the photographic lens, at a position in the vicinity of the outside cover of the camera as shown in FIG. 1, since its angle is smaller than that of the other sidewall located at the other position near to the optical axis of the photographic lens, it becomes possible to derive such a spinout that the camera can be minimized.

SECOND EMBODIMENT

As the second embodiment, the light irradiating section of the auxiliary lighting device, which makes it possible to vary the angle formed between one of the two sidewalls constituting the reflector, located at a position at which a distance from the optical axis of the photographic lens is greater than that for the other sidewall, and the surface orthogonal to the light emitting section, will be detailed in the following.

Figure 3:
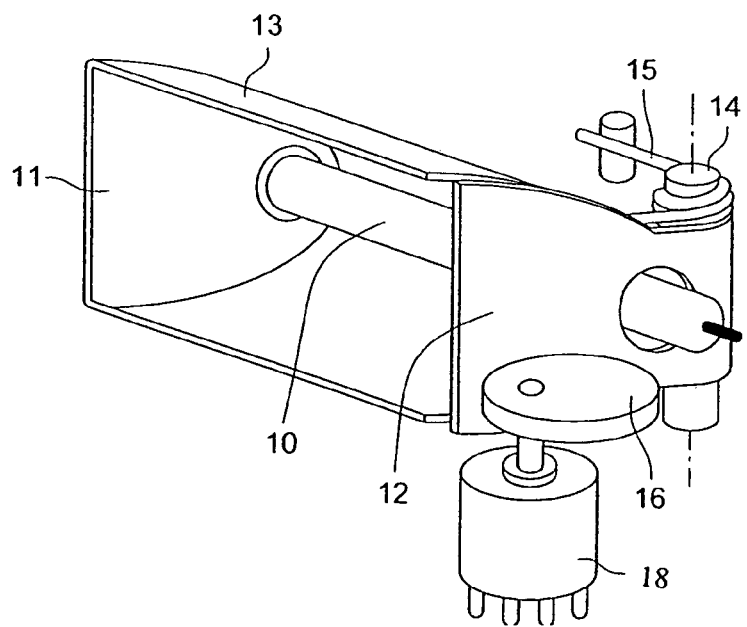
FIG. 3 shows a perspective view of an exemplified rough configuration of a light irradiating section of an auxiliary lighting device embodied in the present invention as a second embodiment.

FIG. 3 shows a perspective view of an exemplified rough configuration of the light irradiating section of the auxiliary lighting device embodied in the present invention as the second embodiment. In FIG. 3, an example of the mechanism for varying the angle of intersection between one of the two sidewalls constituting the reflector, located at a position at which a distance from the optical axis of the photographic lens is greater than that for the other sidewall, and the surface orthogonal to the light emitting section, is indicated.

In FIG. 3, numeral 10 indicates the light emitting section, while numerals 11 and 12 indicate the two sidewalls, which intersect the light emitting section and oppose to each other. The sidewall 11 is located at a position near to the optical axis of the photographic lens, while the sidewall 12 is located at another position far from the optical axis of the photographic lens. Numeral 13 indicates a circumferential wall formed around the axis of the light emitting section 10. In the second embodiment, the circumferential wall 13 and the sidewall 11, located at the position near to the optical axis of the photographic lens, are integrally formed as a single member.

In FIG. 3, the optical axis of the photographic lens is disposed at a position shifted in a left or an inclined lower-left direction from the light emitting section, though it is not shown in FIG. 3. The sidewall 12, located at the position far from the optical axis of the photographic lens, is rotatably supported by a shaft 14 and urged in a right direction as shown in FIG. 3 by a spring 15. The sidewall 12 urged by the spring 15 contacts a cam plate 16 so as to determine the angle formed between the sidewall 12 and the surface orthogonal to the light emitting section 10. The cam plate 16 is driven to rotate by a stepping motor 18. According to the rotation of the cam plate 16, the sidewall 12 can move around the shaft 14 while contacting the cam plate 16, so as to change the angle formed between the sidewall 12 and the surface orthogonal to the light emitting section 10.

Further, based on the concept same as that for the first embodiment, with respect to the subject distance (or the photographing distance) and the operation for setting the angle between the sidewall 12 and the surface orthogonal to the light emitting section 10, it is preferable that the angle of the sidewall 12 is changed according to the rotation of the cam plate 16 coupled to the stepping motor 18, which is driven by a controlling section (not shown in the drawings) corresponding to the subject distance, so that a light, emitted from the center position of the light emitting section 10 and reflected by the leading edge of the sidewall 12, is irradiated onto such a position that is located within the photographic range in the long side direction in regard to the subject distance at the time of the photographing operation.

Concretely speaking, it is preferable that the angle of intersection of the sidewall 12 and the surface orthogonal to the light emitting section 10 is changed, so that the angle α, formed between the sidewall 12 and the surface orthogonal to the light emitting section 10, fulfills the following equation.

$$(\tan^{-1}(a/b) - \tan^{-1}((D-a+c)/(r+b-D\tan\theta)))/2$$

$$\leq \alpha \leq$$

$$(\tan^{-1}(a/b) - \tan^{-1}((D-a+c)/(r+b+D\tan\theta)))/2$$

where the definitions for a, b, c, r, θ are the same as those in the equation for the aforementioned first embodiment.

Incidentally, in regard to the method for finding the subject distance D, when the photographic lens has a focusing function, the subject distance D can be found from, for instance, the stop position of the focusing lens, while when the photographic lens has a photometry function, the subject distance D can be found from an output value with respect to the subject distance measured by the photometry device.

Figure 4:
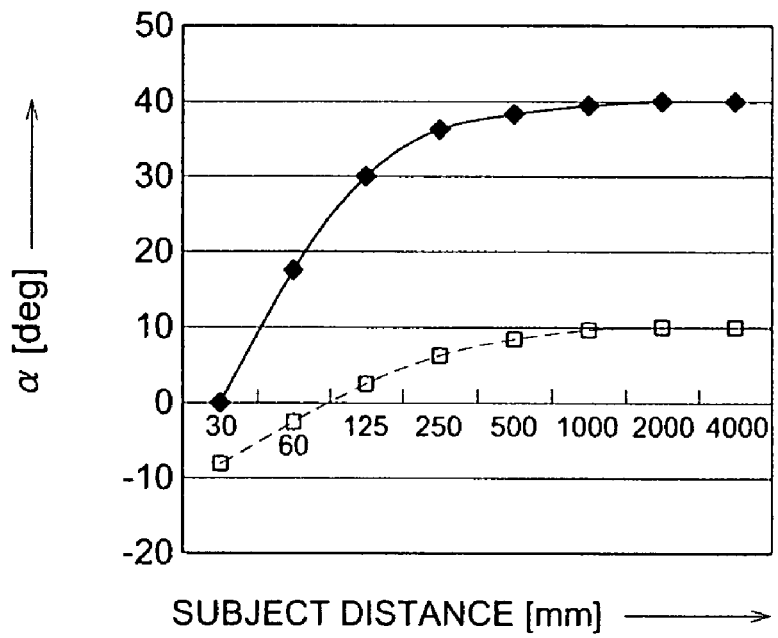
FIG. 4 shows a graph of a range of angle α, formed between a sidewall and a surface orthogonal to a light emitting section, being derived from specifications of a certain camera by employing a conditional equation cited.

FIG. 4 shows a graph of a range of the angle α, formed between the sidewall 12 and the surface orthogonal to the light emitting section 10, being derived from specifications of a certain camera by employing the conditional equation cited in the above. In FIG. 4, the horizontal axis represents the subject distance, while the vertical axis represents the angle α, formed between the sidewall 12 and the surface orthogonal to the light emitting section 10 (refer to FIG. 2), and the specifications includes θ=30°, r=40 mm, a=10 mm, b=12 mm and c=10 mm.

Further, in FIG. 4, the solid line indicates a graph of value α at which a light, emitted from the center position of the light emitting section 10 and reflected by the leading edge of the sidewall 12, passes through (or is irradiated onto) the edge near to the light irradiating section side (namely, position A shown in FIG. 2), which is one of both edges of the photographic range of a long side direction at a subject distance represented on the horizontal axis, while the broken line indicates another graph of value α at which a light, emitted from the center position of the light emitting section 10 and reflected by the leading edge of the sidewall 12, passes through (or is irradiated onto) the edge far from the light irradiating section side (namely, position B shown in FIG. 2).

Concretely speaking, in the second embodiment, the angle α, formed between the sidewall 12 and the surface orthogonal to the light emitting section 10, is changed by rotating the cam plate 16 (shown in FIG. 3) corresponding to the subject distance, so that the angle α is set at a value in a range between a value indicated on the solid line and another value indicated on the broken line for the same subject distance.

Figure 5:
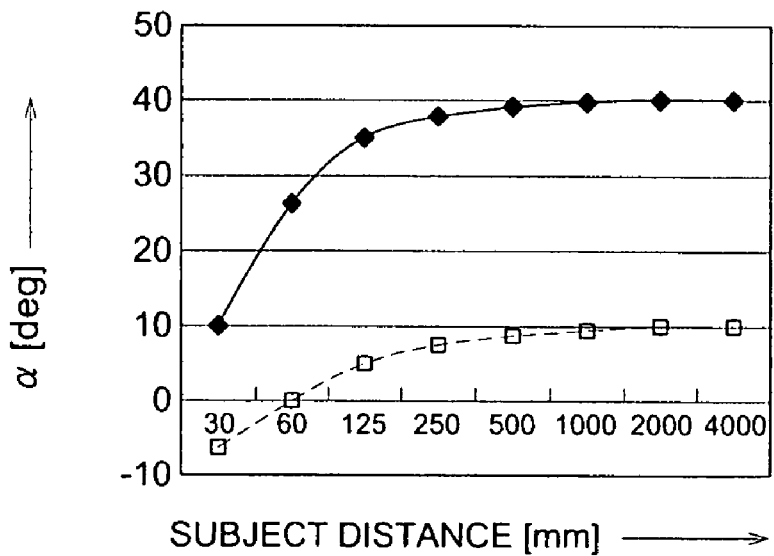
FIG. 5 shows a graph of another range of angle α, formed between a sidewall and a surface orthogonal to a light emitting section, being derived from specifications different from those for FIG. 4.

FIG. 5 shows a graph of another range of the angle α, formed between the sidewall 12 and the surface orthogonal to the light emitting section 10, being derived from specifications different from those for FIG. 4. In FIG. 5, the specifications includes θ=30°, r=20 mm, a=10 mm, b=12 mm and c=5 mm. As shown in FIG. 5, the preferable range of angle α varies depending on the specifications of the camera, and it is possible to establish the shape of the cam plate 16 in advance, corresponding to the specifications of the camera.

It is applicable that the intersecting angle of the sidewall 12 and the surface orthogonal to the light emitting section 10 is changed either continuously or stepwise corresponding to the subject distance. Further, it is also applicable that the camera is so constituted that the above intersecting angle is changeable only in the close-up image capturing mode.

As mentioned in the foregoing, according to the auxiliary lighting device, which is so constituted that the intersecting angle of one of the two sidewalls constituting the reflector, located at a position at which a distance from the optical axis of the photographic lens is greater than that for the other sidewall, and the surface orthogonal to the light emitting section, is changeable, by changing this intersecting angle corresponding to the subject distance, it becomes possible to provide an auxiliary lighting device, which has such an appropriate light distribution characteristic that makes it possible to reduce the unevenness of the exposure amount caused by the parallax over a range of far to near distance (or Tele to Wide photographing mode), even if the light irradiating section of the auxiliary lighting device incorporated in the camera is disposed at such a position that is shifted from the optical axis of the photographic lens.

Incidentally, although the camera having the photographic lens of the bended optical system is exemplified in the foregoing descriptions, the scope of the present invention is not limited to the above. It is needless to say that the present invention can be applied to such a type of camera that protrudes the photographic lens from its front surface when conducting an image capturing operation. Further, although the camera on which the auxiliary lighting device is disposed at the right side position of the photographic lens is exemplified in the foregoing descriptions, it is also needless to say that the present invention can be applied to such a type of camera on which the auxiliary lighting device is disposed at the left side position of the photographic lens.

While the preferred embodiments of the present invention have been described using specific term, such description is for illustrative purposes only, and it is to be understood that changes and variations may be made without departing from the spirit and scope of the appended claims.

The invention is:

1. An auxiliary lighting device that is incorporated in a camera and is disposed at a position being apart from an optical axis of a photographic lens for capturing a subject, comprising:

a light emitting member, shaped in substantially a cylinder to emit light for irradiating a subject;

a circumferential wall reflector disposed behind the light emitting member so as to reflect the light, emitted from the light emitting member, toward the subject;

a first sidewall reflector, a surface of which intersects a longitudinal axis of the light emitting member, and which is disposed at a first position near to the optical axis of the photographic lens; and a second sidewall reflector, a surface of which intersects the longitudinal axis of the light emitting member, and which is disposed at a second position far from the optical axis of the photographic lens, compared to the first position;

wherein a first angle, formed between the first sidewall reflector and an imaginary surface being orthogonal to the longitudinal axis of the light emitting member, is different from a second angle, formed between the second sidewall reflector and another imaginary surface being orthogonal to the longitudinal axis of the light emitting member; and wherein the second angle is set at angle α, which fulfills the equation of, $$(\tan^{-1}(a/b) - \tan^{-1}((D-a+c)/(r+b-D\tan\theta)))/2 \leq \alpha \leq (\tan^{-1}(a/b) - \tan^{-1}((D-a+c)/(r+b+D\tan\theta)))/2,$$
where a is a distance between the longitudinal axis of the light emitting member and a leading edge of the second sidewall reflector in a direction of the optical axis of the photographic lens, b is a distance between a center of the light emitting section and the leading edge of the second sidewall reflector in a direction orthogonal to the optical axis of the photographic lens, c is a distance between the longitudinal axis of the light emitting member and an intersect of long side light bundles in the direction of the optical axis of the photographic lens, r is a distance between the optical axis of the photographic lens and the center of the light emitting section in the direction orthogonal to the optical axis of the photographic lens, D is a distance between a photographic position in a most close-up distance photographing mode and the intersect of the long side light bundles in the direction of the optical axis of the photographic lens, and θ is a half angle of view in a long side direction.

2. The auxiliary lighting device of claim 1, wherein the light emitting member is a Xenon tube.

3. The auxiliary lighting device of claim 1, wherein the second angle is smaller than the first angle.

4. An auxiliary lighting device that is incorporated in a camera and is disposed at a position being apart from an optical axis of a photographic lens for capturing a subject, comprising:

a light emitting member, shaped in substantially a cylinder, to emit light for irradiating a subject;

a circumferential wall reflector disposed behind the light emitting member so as to reflect the light, emitted from the light emitting member, toward the subject;

a first sidewall reflector, a surface of which intersects a longitudinal axis of the light emitting member, and which is disposed at a first position near to the optical axis of the photographic lens; and a second sidewall reflector, a surface of which intersects the longitudinal axis of the light emitting member, and which is disposed at a second position far from the optical axis of the photographic lens, compared to the first position;

wherein a second angle, formed between the second sidewall reflector and an imaginary surface being orthogonal to the longitudinal axis of the light emitting member, is changeable; and wherein the second angle is changed to angle α, which fulfills the equation of, $$(\tan^{-1}(a/b) - \tan^{-1}((D-a+c)/(r+b-D\tan\theta)))/2 \leq \alpha \leq (\tan^{-1}(a/b) - \tan^{-1}((D-a+c)/(r+b+D\tan\theta)))/2,$$
where a is a distance between the longitudinal axis of the light emitting member and a leading edge of the second sidewall reflector in a direction of the optical axis of the photographic lens, b is a distance between a center of the light emitting section and the leading edge of the second sidewall reflector in a direction orthogonal to the optical axis of the photographic lens, c is a distance between the longitudinal axis of the light emitting member and an intersect of long side light bundles in the direction of the optical axis of the photographic lens, r is a distance between the optical axis of the photographic lens and the center of the light emitting section in the direction orthogonal to the optical axis of the photographic lens, D is a distance between a photographic position in a most close-up distance photographing mode and the intersect of the long side light bundles in the direction of the optical axis of the photographic lens, and θ is a half angle of view in a long side direction.

5. The auxiliary lighting device of claim 4, wherein the light emitting member is a Xenon tube.

6. The auxiliary lighting device of claim 4, wherein the second angle is changed, corresponding to a subject distance.

* * * * *